US011830462B2

(12) United States Patent
Maezawa (10) Patent No.: US 11,830,462 B2
(45) Date of Patent: Nov. 28, 2023

(54) INFORMATION PROCESSING DEVICE FOR DATA REPRESENTING MOTION

(71) Applicant: Yamaha Corporation, Shizuoka (JP)

(72) Inventor: Akira Maezawa, Shizuoka (JP)

(73) Assignee: YAMAHA CORPORATION, Shizuoka (JP)

( * ) Notice: Subject to any disclaimer, the term of this patent is extended or adjusted under 35 U.S.C. 154(b) by 434 days.

(21) Appl. No.: 17/182,641

(22) Filed: Feb. 23, 2021

(65) Prior Publication Data

US 2021/0174771 A1    Jun. 10, 2021

Related U.S. Application Data

(63) Continuation of application No. PCT/JP2019/034384, filed on Sep. 2, 2019.

(30) Foreign Application Priority Data

Sep. 3, 2018 (JP) .................. 2018-164362

(51) Int. Cl.
*G10H 1/00* (2006.01)
*G06N 3/04* (2023.01)
*G06N 3/08* (2023.01)
*G06N 3/049* (2023.01)
*G06N 3/045* (2023.01)

(52) U.S. Cl.
CPC .......... *G10H 1/0008* (2013.01); *G06N 3/045* (2023.01); *G06N 3/049* (2013.01); *G06N 3/08* (2013.01); *G10H 2220/201* (2013.01); *G10H 2250/311* (2013.01)

(58) Field of Classification Search
CPC ............. G10H 1/0008; G10H 222/201; G10H 2250/311; G06N 3/045; G06N 3/049; G06N 3/08
USPC ........................................................ 84/602
See application file for complete search history.

(56) References Cited

U.S. PATENT DOCUMENTS 7,394,010 B2 * 7/2008 Nishibori ................. G10H 1/34
                                                  84/622
7,474,197 B2 * 1/2009 Choi .................... G10H 1/0008
                                                  340/384.1
(Continued)

FOREIGN PATENT DOCUMENTS

CN     113160848 A  *  7/2021
CN     109462776 B  *  8/2021  ............. G06T 7/246
(Continued)

OTHER PUBLICATIONS

International Search Report in PCT/JP2019/034384, dated Oct. 15, 2019.
(Continued)

*Primary Examiner* — Christina M Schreiber
(74) *Attorney, Agent, or Firm* — Global IP Counselors, LLP (57) ABSTRACT

An information processing method includes generating a change parameter relating to a process in which a temporal relationship between a first motion and a second motion changes, by inputting, into a trained model, first time-series data that represent a content of the first motion, and second time-series data that represent a content of the second motion in parallel to the first motion.

18 Claims, 4 Drawing Sheets

(56) References Cited

U.S. PATENT DOCUMENTS

| | | | | |
|---|---|---|---|---|
| 8,044,289 | B2* | 10/2011 | Toledano | G10H 1/34 84/602 |
| 10,846,519 | B2* | 11/2020 | Maezawa | G06F 3/013 |
| 11,557,269 | B2* | 1/2023 | Maezawa | G10H 1/0008 |
| 11,609,736 | B2* | 3/2023 | Maezawa | G06T 11/206 |
| 2017/0337910 | A1* | 11/2017 | Maezawa | G10H 1/361 |
| 2018/0124646 | A1* | 5/2018 | Thubert | H04W 48/18 |
| 2019/0156806 | A1* | 5/2019 | Maezawa | G10H 1/00 |
| 2019/0156809 | A1* | 5/2019 | Maezawa | G10H 1/361 |
| 2020/0021865 | A1* | 1/2020 | Topiwala | H04N 19/172 |
| 2020/0394989 | A1* | 12/2020 | Maezawa | G06N 20/00 |
| 2021/0005173 | A1* | 1/2021 | Maezawa | G10H 1/0008 |
| 2021/0020149 | A1* | 1/2021 | Li | G11B 27/28 |
| 2021/0174771 | A1* | 6/2021 | Maezawa | G06N 3/08 |
| 2021/0383714 | A1* | 12/2021 | Furuya | G09B 5/00 |
| 2022/0036866 | A1* | 2/2022 | Isozaki | G10G 1/00 |
| 2022/0346885 | A1* | 11/2022 | Kunio | G06T 7/143 |
| 2022/0383842 | A1* | 12/2022 | Kaneko | G10H 1/0025 |
| 2022/0414472 | A1* | 12/2022 | Maezawa | G06N 3/08 |
| 2023/0014315 | A1* | 1/2023 | Maezawa | G10H 1/0066 |
| 2023/0014736 | A1* | 1/2023 | Maezawa | G06V 40/23 |
| 2023/0185848 | A1* | 6/2023 | Nasir | G06N 3/045 707/722 |

FOREIGN PATENT DOCUMENTS

| | | | |
|---|---|---|---|
| CN | 115035909 A | * | 9/2022 |
| WO | 2018016581 A1 | | 1/2018 |

OTHER PUBLICATIONS

Notice of First Examination Opinion in the corresponding Chinese Patent Application No. 201980056121.9, dated Aug. 25, 2023.

\* cited by examiner

INFORMATION PROCESSING DEVICE FOR DATA REPRESENTING MOTION

CROSS-REFERENCE TO RELATED APPLICATIONS

This application is a continuation application of International Application No. PCT/JP2019/034384, filed on Sep. 2, 2019, which claims priority to Japanese Patent Application No. 2018-164362 filed in Japan on Sep. 3, 2018. The entire disclosures of International Application No. PCT/JP2019/034384 and Japanese Patent Application No. 2018-164362 are hereby incorporated herein by reference.

BACKGROUND

Technological Field

The present invention relates to a technology for processing data that represent an motion such as the performance of a musical piece.

Background Information

Numerous scenarios can be assumed in which a plurality of actual performers perform in parallel and in mutual cooperation, such as when a plurality of performers perform a musical piece in ensemble. Non-Patent Document "Takeshi Katahira, "Interpersonal Effects of Nonverbal Communication in Ensemble Scenarios," Japanese Journal of Interpersonal and Social Psychology 12:51-58, 2012" discloses that the performances of a plurality of performers become synchronized as a result of nonverbal interaction among the performers.

SUMMARY

It would be convenient if it were possible to estimate the process by which the temporal relationships (for example, time differences) among the performances of a plurality of performers change. For example, in a scenario in which an automatic performance instrument is made to execute an automatic performance of a musical piece in parallel with an actual performance of the musical piece by performers, the result of such an estimation could make it possible for the automatic performance to follow (or, intentionally not follow) the actual performance in a natural manner. In the foregoing explanation, the control of an automatic performance was emphasized for the sake of convenience, but the result of estimating the process by which the temporal relationships among a plurality of actual performances change can be effectively used in situations other than in the control of an automatic performance. In consideration of such circumstances, an object of this disclosure is to estimate the process by which the temporal relationships among a plurality of motions change.

In order to solve the problem described above, an information processing method according to a preferred aspect of this disclosure includes generating a change parameter relating to a process in which a temporal relationship between a first motion and a second motion changes, by inputting, into a trained model, first time-series data that represent a content of the first motion and second time-series data that represent a content of the second motion in parallel to the first motion.

An information processing device according to a preferred aspect of this disclosure includes an electronic controller including at least one processor, and the electronic controller is configured to execute an estimation processing module that generates a change parameter relating to a process in which a temporal relationship between a first motion and a second motion changes, by inputting, into a trained model, first time-series data that represent a content of the first motion and second time-series data that represent a content of the second motion in parallel to the first motion.

BRIEF DESCRIPTION OF THE DRAWINGS

Referring now to the attached drawings which form a part of this original disclosure.

DETAILED DESCRIPTION OF THE EMBODIMENTS

Selected embodiments will now be explained in detail below, with reference to the drawings as appropriate. It will be apparent to those skilled from this disclosure that the following descriptions of the embodiments are provided for illustration only and not for the purpose of limiting the invention as defined by the appended claims and their equivalents.

Figure 1:
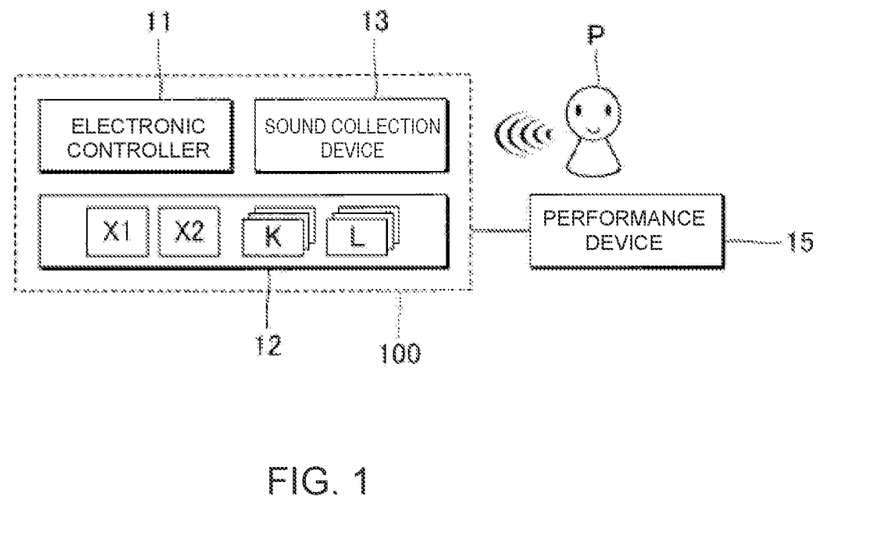
FIG. 1 is a block diagram illustrating the structure of an information processing device according to an embodiment.

FIG. 1 is a block diagram showing the configuration of an information processing device 100 according to a preferred embodiment. As shown in FIG. 1, the information processing device 100 according to the present embodiment is realized by a computer system that includes an electronic controller 11, a storage device 12, and a sound collection device 13. An information terminal such as a mobile phone, a smartphone, or a personal computer, for example, can be suitably used as the information processing device 100.

The performer P of FIG. 1 plays a musical instrument. The sound collection device 13 collects the sound generated from the musical instrument during the performance by the performer P and generates an audio signal representing said sound. The performer P performs a first performance part from among a plurality of performer parts constituting the musical piece. Accordingly, the sound collection device 13 generates an audio signal representing the performance sound of the first performance part of the musical piece. An illustration of an A/D converter that converts the audio signal generated by the sound collection device 13 from analog to digital is omitted for the sake of convenience.

An audio signal that is generated by an electric musical instrument, such as an electric string instrument, can be supplied to the information processing device 100. In a configuration in which an electric musical instrument generates an audio signal, the sound collection device 13 is omitted. An audio signal representing the voice of the performer P singing a first performance part of a song can be generated by the sound collection device 13. In addition, a configuration in which the sound collection device 13 is mounted on the information processing device 100 is illustrated in FIG. 1; however, the sound collection device 13 that is separate from the information processing device 100 can be connected to the information processing device 100 wirelessly or by wire.

The electronic controller 11 is a processing circuit and includes at least one processor, such as a CPU (Central Processing Unit) and comprehensively controls each element of the information processing device 100. The term "electronic controller" as used herein refers to hardware that executes software programs. The electronic controller 11 can be configured to comprise, instead of the CPU or in addition to the CPU, programmable logic devices such as a DSP (Digital Signal Processor), an FPGA (Field Programmable Gate Array), and the like. In addition, the electronic controller 11 can include a plurality of CPUs (or a plurality of programmable logic devices). A program that is executed by the electronic controller 11 and various data that are used by the electronic controller 11 are stored in the storage device 12. A known storage medium, such as a magnetic storage medium or a semiconductor storage medium, is used as the storage device 12. The storage device 12 can include a combination of a plurality of types of storage media. The storage device 12 can be any computer storage device or any computer readable medium with the sole exception of a transitory, propagating signal. A portable storage medium that can be attached to/detached from the information processing device 100, or an external storage medium (for example, online storage) with which the information processing device 100 can communicate via a communication network, can also be used as the storage device 12.

The storage device 12 according to the present embodiment stores performance data X1 and performance data X2. Performance data X1 represent the content of the performance of the first performance part of the musical piece. That is, performance data X1 represent the content of the performance by the performer P. However, since the actual performance of the performer P reflects the musical intentions peculiar to the performer P, the performance represented by performance data X1 does not precisely match the performance represented by the performer P. On the other hand, performance data X2 represent the content of the performance of the second performance part of the musical piece. The first performance part and the second performance part are separate performance parts of the musical piece. For example, the first performance part is the melody part and the second performance part is the accompaniment part. For example, MIDI data conforming to the MIDI (Musical Instrument Digital Interface) standard are suitable as performance data X1 and performance data X2. Specifically, performance data X1 and performance data X2 are a time series of data (for example, MIDI event data) that specify the pitch and volume of each of a plurality of musical notes of each performance part to thereby provide instruction for sound generation or muting.

The performance device 15 executes an automatic performance of a musical piece under the control of the information processing device 100. More specifically, the performance device 15 is an automatic performance instrument (for example, an automatic piano) that includes a sound generating mechanism for causing a sound generating body such as a string to generate sound, and a drive mechanism for driving the sound generating mechanism. The automatic performance is realized by the drive mechanism driving the sound generating mechanism in accordance with instructions from the information processing device 100. The performance device 15 according to the present embodiment executes the automatic performance for the second performance part represented by performance data X2. The information processing device 100 can also be mounted on the performance device 15.

Figure 2:
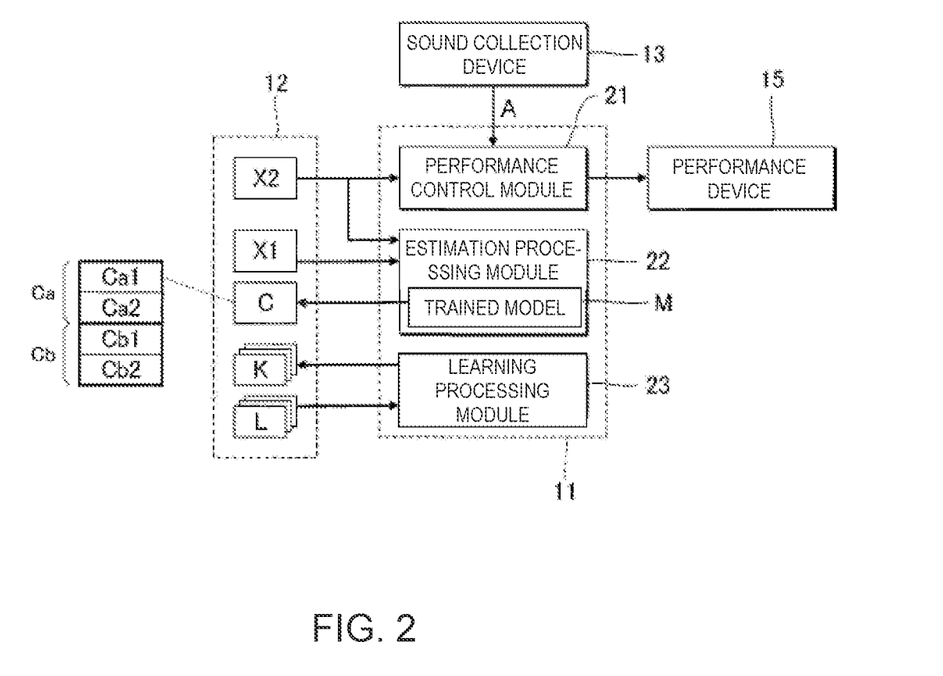
FIG. 2 is a block diagram illustrating the functional configuration of the information processing device.

FIG. 2 is a block diagram illustrating a functional configuration of the information processing device 100. As shown in FIG. 2, the electronic controller 1 executes a program stored in the storage device 12 in order to execute a plurality of modules (performance control module 21, estimation processing module 22, and learning processing module 23) to realize a plurality of functions. Moreover, the modules (functions) of the electronic controller 11 can be realized by a plurality of discretely configured devices. Some or all of the functions of the electronic controller 11 can be realized by one or more dedicated electronic circuits.

The performance control module 21 causes the performance device 15 to execute the automatic performance of the second performance part represented by performance data X2 in parallel with the performance of the first performance part by the performer P. The performance control module 21 of the present embodiment controls the automatic performance of the performance device 15 so as to follow the performance of the first performance part by the performer P. More specifically, the performance control module 21 analyzes an audio signal A generated by the sound collection device 13 to estimate the time point at which the performer P is performing the musical piece (hereinafter referred to as "performance time point") and to control the automatic performance of the second performance part executed by the performance device 15 so that the progression of the performance time point can be followed. Thus, it is possible to create an atmosphere such as one in which the performer P and the performance device 15 are performing together in harmony and in a coordinated manner. A known analytical technology (score alignment technology) can be freely employed for the estimation of the performance time point. For example, a technology called beat tracking or a technology for tracking the performance time point in the musical score that utilizes a Kalman filter can be employed.

Figure 3:
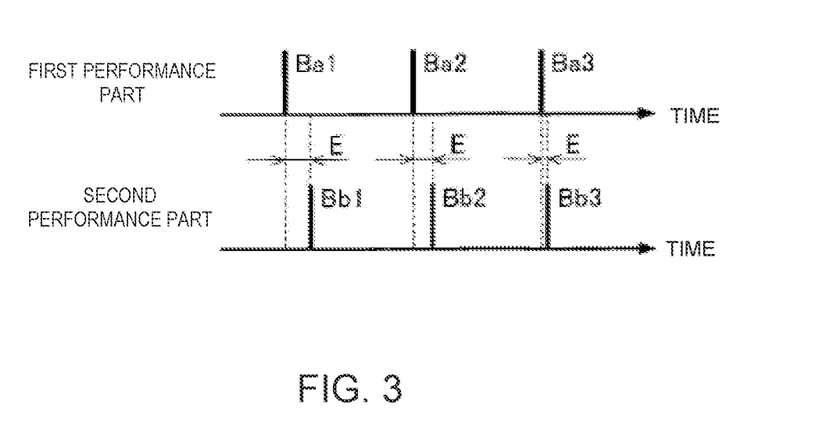
FIG. 3 is an explanatory diagram of a temporal error between a performance time point of a first performance part and a performance time point of a second performance part.

The trend of the actual ensemble by a plurality of performers will be described. FIG. 3 is an explanatory diagram of the temporal relationship between each sound generation point Ba (Ba1, Ba2, . . . ) of the first performance part and each sound generation point Bb (Bb1, Bb2, . . . ) of the second performance part.

It is assumed that each sound generation point Ba and each sound generation point Bb are defined to be pronounced simultaneously in the musical score of the musical piece. That is, if the performance were performed in accordance with the musical score, each sound generation point Ba and each sound generation point Bb would coincide on the time axis. However, in an actual performance, each sound generation point Ba of the first performance part and each sound generation point Bb of the second performance part will not completely coincide on the time axis, since the musical intentions, preferences, etc., of each performer are reflected therein. A temporal error (that is, time difference) E occurs between the performance time point of the first performance part and the performance time point of the second performance part. Error E is the temporal relationship between the performance of the first performance part and the performance of the second performance part. Error E can be divided into an error Ea of the first performance part with respect to the second performance part, and an error Eb of the second performance part with respect to the first performance part.

During an actual ensemble scenario, the temporal relationship between the first performance part and the second performance part (that is, error E) fluctuates from moment to moment depending on the contents of the musical piece. For example, trends, such as whether following occurs between the first performance part and the second performance part, whether the first performance part follows the second performance part or vice versa (follow direction), and what degree of following occurs between the performance parts depend on the content, such as the pattern of the arrangement of the notes in the musical piece (that is, the musical context). For example, various trends can be assumed, such as the second performance part following the first performance part in a section of the musical piece in which there is a large number of sounds in the first performance part, and the first performance part follows the second performance part in a section of the musical piece in which the musical notes of the second performance part are generated with a prescribed rhythm.

Here, the temporal change in error E in the performance time points between the performance parts can be approximated by means of an autoregressive process (AR (autoregressive) model). More specifically, error Ea and error Eb are expressed by means of a second-order autoregressive process expressed by the following equations. The symbol t is any time point on the time axis.

$$Ea(t)=Ca1 \cdot Ea(t-1)+Ca2 \cdot Ea(t-2) \quad (1)$$

$$Eb(t)=Cb1 \cdot Eb(t-1)+Cb2 \cdot Eb(t-2) \quad (2)$$

The symbols Ca1 and Ca2 in equation (1) and symbols Cb1 and Cb2 in equation (2) are parameters of the autoregressive process that approximates the change in error E. In the following description, the set of the symbols Ca1 and Ca2 of equation (1) and the symbols Cb1 and Cb2 of equation (2) is referred to as "change parameter C." Change parameter C includes a first parameter Ca (Ca1 and Ca2) corresponding to error Ea, and a second parameter Cb (Cb1 and Cb2) corresponding to error Eb.

As described above, error E in the performance time points between the performance parts is dependent on the content of the musical piece, and error E is approxmiated by means of the autoregressive process defined by change parameter C. Thus, change parameter C of error E tends to depend upon the content of the musical piece. In order that this trend is reproduced in the automatic performance, the performance control module 21 according to the present embodiment controls the performance time points by the performance device 15 such that error E between the performance time point of the first performance part by the performer P and the performance time point of the second performance part by the performance device 15 changes over time in accordance with the content of the musical piece. In order to realize the control by the performance control module 21 described above, the estimation processing module 22 of FIG. 2 generates a time series of change parameter C from performance data X1 and performance data X2 stored in the storage device 12.

As shown in FIG. 2, the estimation processing module 22 of the present embodiment inputs performance data X1 and performance data X2 of the musical piece into the trained model M in order to generate a time series of the change parameter C relating to the temporal change in error E between the first performance part and the second performance part of said musical piece. Change parameter C includes the first parameter Ca (Ca1 and Ca2) indicating error Ea of the first performance part with respect to the second performance part, and the second parameter Cb (Cb1 and Cb2) indicating error Eb of the second performance part with respect to the first performance part.

The performance control module 21 controls the automatic performance of the performance device 15 in accordance with change parameter C generated by the estimation processing module 22. More specifically, the performance control module 21 controls the automatic performance of the performance device 15 such that error Ea and error Eb between the performance of the first performance part by the performer P and the automatic performance of the second performance part by the performance device 15 change over time in accordance with the autoregressive process defined by change parameter C, for example. It is thus possible to cause the performance device 15 to execute an automatic performance in which the degree and direction of following change in an audibly natural manner with respect to the first performance part by the performer P.

Figure 4:
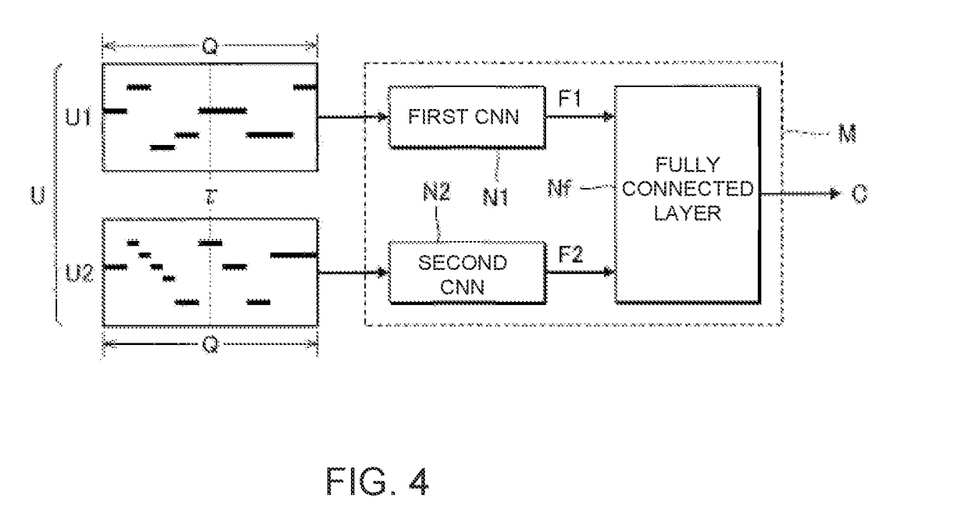
FIG. 4 is a block diagram illustrating the configuration of a trained model.

FIG. 4 is a block diagram illustrating a specific configuration of a trained model M. The estimation processing module 22 sequentially selects each of a plurality of time points on the time axis as a processing time point τ in the order of the time series, and inputs processing data U corresponding to processing time point τ in the trained model M, as shown in FIG. 4. Processing data U include unit data U1 and unit data U2. Unit data U1 (example of first time-series data) are a part of a unit interval Q of performance data X1 that includes processing time point τ. Similarly, unit data U2 (example of second time-series data) are a part of a unit interval Q of performance data X1 that includes processing time point T. Unit interval Q is of prescribed length (for example one bar of a musical piece) centered on processing time point τ on the time axis, for example. As can be understood from the foregoing explanation, unit data U1 are time-series data that represent the performance content within unit interval Q of the first performance part of the musical piece (example of a content of a first motion), and unit data U2 are time-series data that represent the performance content within the unit interval Q of the second performance part of the musical piece (example of a content of a second motion). The change parameter C relates to a process in which a temporal relationship between the performance of the first performance part (first motion) and the performance of the second performance part (second motion) changes. The trained model M outputs change parameter C for each piece of processing data U.

The trained model M is a statistical predictive model that has learned the relationship between processing data U and change parameter C. More specifically, the trained model M is realized by means of a combination of a program (for example, a program module constituting artificial intelligence software) that causes the electronic controller 11 to execute a computation to generate change parameter C from processing data U, and a plurality of coefficients K that are applied to the computation. The plurality of coefficients K which define the trained model M are set by means of machine learning (particularly, deep learning) that utilizes a plurality of pieces of training data and are stored in the storage device 12. The machine learning of the trained model M will be described further below.

As shown in FIG. 4, the trained model M according to the present embodiment includes a first convolutional neural network (CNN) N1, a second convolutional neural network (CNN) N2, and a fully connected layer Nf. Both the first convolutional neural network N1 and the second convolutional neural network N2 are neural networks in which a plurality of convolutional layers and a plurality of pooling layers are stacked. The configurations of the first convolutional neural network N1 and the second convolutional neural network N2 are the same. Unit data U1 are input to the first convolutional neural network N1 and unit data U2 are input to the second convolutional neural network N2.

The first convolutional neural network N1 generates feature data F1 (example of first feature data) which represent one or more features of unit data U1. The second convolutional neural network N2 generates feature data F2 (example of second feature data) which represent one or more features of unit data U2. The one or more features represented by feature data F1 are one or more musical features of the first performance part that contribute to the association between processing data U and change parameter C. Similarly, the one or more features represented by feature data F2 are one or more musical features of the second performance part that contribute to the association between processing data U and change parameter C. The fully connected layer Nf generates change parameter C corresponding to feature data F1 generated by the first convolutional neural network N1 and feature data F2 generated by the second convolutional neural network N2.

Figure 5:
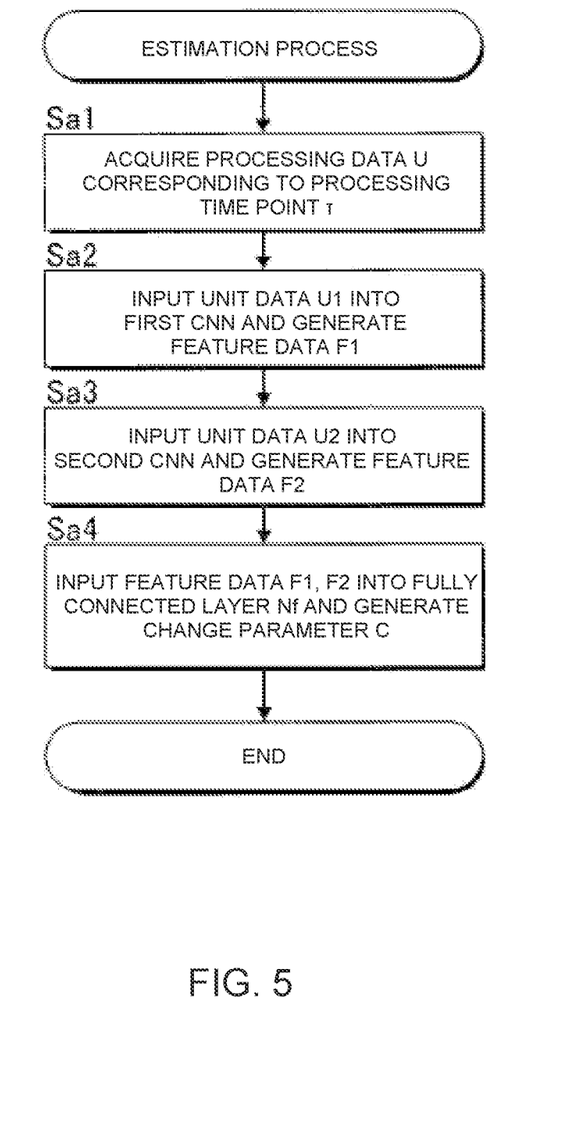
FIG. 5 is a flowchart showing the specific procedure of an estimation process.

FIG. 5 is a flowchart illustrating the specific procedure of a process by which the estimation processing module 22 generates change parameter C (hereinafter referred to as the "estimation process"). The estimation process of FIG. 5 is executed for each of the plurality of time points on the time axis using said time point as processing time point τ.

When the estimation process is started, the estimation processing module 22 acquires unit data U1 and unit data U2 from the storage device 12 that correspond to processing time point τ as processing data U (Sa1). The estimation processing module 22 generates change parameter C by inputting unit data U1 and unit data U2 into the trained model M(Sa2-Sa4). More specifically, the estimation processing module 22 inputs unit data U1 into the first convolutional neural network N1 in order to F1 (Sa2), and inputs unit data U2 into the second convolutional neural network N2 in order to generate feature data F2 (Sa3). The order of the generation of feature data F1 (Sa2) and the generation of feature data F2 (Sa3) can be reversed. Then, the estimation processing module 22 inputs feature data F1 and feature data F2 into the fully connected layer Nf in order to generate change parameter C (Sa4). Repetition of the aforementioned process for each processing time point τ results in the generation of the time series of change parameter C for all segments of the musical piece.

The learning processing module 23 of FIG. 2 generates the trained model M that is used for the estimation process. More specifically, the learning processing module 23 sets the plurality of coefficients K of the trained model M by means of a process (hereinafter referred to as the "learning process") in which a plurality of sets of training data L are used iteratively to update the plurality of coefficients K. Training data L of each set include processing data U and change parameter C. Change parameter C included in training data L of each set is a known correct answer value observed from the temporal error between the first performance part and the second performance part. That is, change parameter C of training data L of each set is observed by analyzing the temporal change in the error between the performance time points of the first performance part and the second performance part from the result of actual performance of the unit interval Q represented by processing data U of training data L. Training data L corresponding to a plurality of arbitrary musical pieces are stored in the storage device 12 for the learning process.

Figure 6:
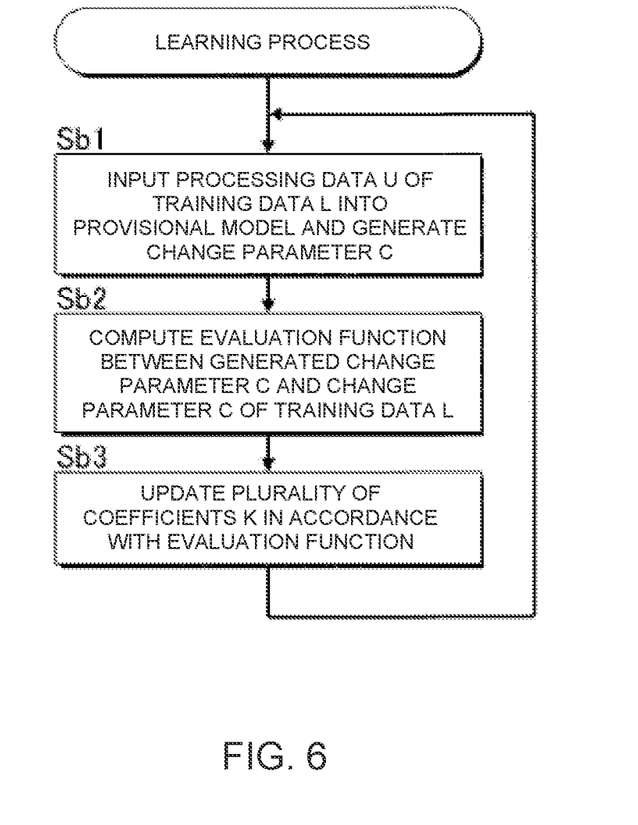
FIG. 6 is a flowchart showing the specific procedure of a learning process.

FIG. 6 is a flowchart showing a specific procedure of the learning process in which the learning processing module 23 generates the trained model M. The learning process of FIG. 5 is executed before the execution of the estimation process by the estimation processing module 22.

When the learning process is started, the learning processing module 23 inputs processing data U of training data L into a model (hereinafter referred to as "provisional model") in which the plurality of coefficients K are set to provisional values in order to generate change parameter C (Sb1). As w the trained model M shown in FIG. 4, the provisional model includes the first convolutional neural network N1, the second convolutional neural network N2, and the fully connected layer Nf. The learning processing module 23 calculates an evaluation function that represents the difference between change parameter C generated by the provisional model and change parameter C of training data L (Sb2). The learning processing module 23 updates the plurality of coefficients K of the provisional model such that the evaluation function approaches a prescribed value (typically, zero) (Sb3). For example, the backpropagation method is suitably used for updating each coefficient K corresponding to evaluation function. The process described above (Sb1-Sb3) is repeated for each of the plurality of sets of training data L. The provisional model at the stage in which the updating of the plurality of coefficients K is completed is used for the estimation process as the final trained model M.

As can be understood from the foregoing explanation, by means of the present embodiment it is possible to generate a statistically valid change parameter C with respect to unknown processing data U on the basis of a latent trend between processing data U and change parameter C in the plurality of sets of training data L. That is, it is possible to estimate the process in which temporal relationship between the performance of the first performance part and the performance of the second performance part changes.

In particular, in the present embodiment, since change parameter C includes the first parameter Ca and the second parameter Cb, there is the advantage that it is possible to generate a parameter relating to the mutual relationship between the performance of the first performance part and the performance of the second performance part. In addition, since the process in which temporal error E between the performance of the first performance part and the performance of the second performance part changes is approximated by means of the autoregressive process, there is also the advantage that it is possible to generate change parameter C that represents the process in which error E in the performance time points between the performance parts changes naturally.

Modified Examples

Specific modifications to be added to each of the foregoing embodiments that serve as examples are illustrated below. Two or more embodiments arbitrarily selected from the following examples can be appropriately combined as long as they are not mutually contradictory.

(1) In the embodiments described above, an example was used in which the first performance part and the second performance part of the musical piece are different performance parts, but the first performance part and the second performance part can be the same performance part. In a configuration in which the first performance part and the second performance part are the same, it is possible to estimate change parameter C relating to temporal error E between two performances in the case in which one performer part of the musical piece is performed by a plurality of performers in parallel (so-called unison).

(2) Performance data X1 that represent the average performance of the first performance part by a plurality of performers can be used as performance data X1 (unit data U1). By means of the configuration described above, it is possible to generate a change parameter C that appropriately expresses the temporal change in error E with respect to the second performance part when a plurality of performers perform the first performance part. Similarly, performance data that represent the average performance of the second performance part by a plurality of performers can be used as performance data X2 (unit data U2).

(3) In the embodiments described above, MIDI data are used as an example of performance data X1 and performance data X2, but the specific formats of performance data X1 (unit data U1) and performance data X2 (unit data U2) are arbitrary. For example, a time series of the samples that represent the waveform of the performance sound of the first performance part can be used as performance data X1, and a time series of the samples that represent the waveform of the performance sound of the second performance part can be used as performance data X2. In addition, motion data that represent the motion of each part of a performer's body during the performance of the first performance part can be used as performance data X1, and motion data that represent the motion of each part of a performer's body during the performance of the second performance part can be used as performance data X2.

(4) In the embodiments described above, the temporal change in error E in the performance time points between the first performance part and the second performance part is approximated by means of an autoregressive process, but the model for approximating the temporal change in error E is not limited to the example described above. For example, it is possible to approximate the temporal change in error E by means of a vibration process, such as nonlinear vibration, and estimate change parameter C defining said vibration process.

(5) In the embodiments described above, change parameter C that represents the temporal change in the error between the performance of the first performance part and the performance of the second performance part is generated, but this disclosure can be used in the same manner as in the above-described embodiments in any scenario in which change parameter C that represents the temporal change in the relationship between a plurality of motions that are in parallel to each other (executed concurrently) is estimated. For example, it is possible to input unit data U that represent a particular dance (first dance) and unit data U2 that represent another dance in parallel to (performed concurrently with) the first dance (second dance) into the trained model M in order to generate change parameter C that relates to the process in which the temporal relationship between the first dance and the second dance changes. For example, the first dance is a male dance and the second dance is a female dance, in a couple dance performed by male and female partners. As can be understood from the foregoing explanation, unit data U1 are comprehensively expressed as first time-series data that represent the content of a first motion, and unit data U2 are comprehensively expressed as second time-series data that represent the content of a second motion. A typical example of the first motion and the second motion is a performance (operation), such as a musical performance or a dance, but no limitation is imposed by the foregoing examples.

(6) In the embodiments described above, the information processing device 100 provided with both the estimation processing module 22 and the learning processing module 23 is illustrated as an example, but the estimation processing module 22 and the learning processing module 23 can be realized by means of discrete information processing devices. The information processing device provided with the estimation processing module 22 is realized as an estimation device for estimating change parameter C from processing data U. The presence or absence of the learning processing module 23 in the estimation device is immaterial. The information processing device provided with the learning processing module 23 is realized as a learning device for generating the trained model M by means of a learning process utilizing a plurality of sets of training data L. The presence or absence of the estimation processing module 22 in the learning device is immaterial. The learning device can be realized by means of a server device that can communicate with the terminal device, and the trained model M generated by the learning device can be distributed to the terminal device. The terminal device is provided with the estimation processing module 22 that executes the estimation process using the trained model M distributed from the learning device.

(7) The function of the information processing device 100 according to the embodiments described above is realized by cooperation between a computer (for example, the electronic controller 11) and a program. The program according to a preferred aspect is provided, for example, in a form storable on a computer-readable storage medium and installed on a computer. The storage medium, for example, is a non-transitory storage medium, a good example of which is an optical storage medium (optical disc) such as a CD-ROM, but can include storage media of any known format, such as a semiconductor storage medium or a magnetic storage medium. Non-transitory storage media include any storage medium that excludes transitory propagation signals and does not exclude volatile storage media. Furthermore, it is also possible to deliver the program to a computer in the form of distribution via a communication network.

(8) The means for executing the artificial intelligence software for realizing the trained model M is not limited to a CPU. A dedicated neural network processing circuit, such as a Tensor Processing Unit or a Neural Engine, or a dedicated artificial intelligence DSP (Digital Signal Processor) can execute the artificial intelligence software, for example. In addition, a plurality of processing circuits selected from the examples described above can execute the artificial intelligence software in mutual cooperation.

(9) Synchronization between various motions becomes possible through utilization of change parameter C, as described above. In the foregoing embodiment, an example is primarily described in which the motion of a machine (automatic performance by the performance device) is made to follow human movements (actual performance by the performer P), but the application range of this disclosure is not limited in this way. For example, the motion of one machine can be synchronized to the motion of another machine. By means of this aspect, it is possible to synchronize the performance of an automatic player piano and the performance of an automatic player drum. In the example of the dance described above, the dance of one robot can be synchronized with the dance of another robot. To provide another example, audio signal data that represent the performance sounds of a first performance part and audio signal data that represent the performance sounds of a second performance part, which were performed and recorded separately, can be acquired and played synchronously based on change parameter C. As described above, it is possible to control the actual performance of the second motion in parallel with the actual performance of the first motion in various scenarios, based on change parameter C.

Aspect

For example, the following configurations can be understood from the foregoing embodiment examples.

An information processing method according to a preferred aspect (first aspect) comprises inputting first time-series data that represent the content of a first motion, and second time-series data that represent the content of a second motion parallel to the first motion into a trained model, in order to generate a change parameter relating to the process in which the temporal relationship between the first motion and the second motion changes. According to the aspect described above, based on the relationship between the contents of the first motion and the second motion and the process in which the temporal relationship between the two motions changes, as learned by the trained model, it is possible to estimate an unknown process in which the temporal relationship between a first motion and a second motion changes.

In a preferred example (second aspect) of the first aspect, the change parameter includes a first parameter relating to a process in which a temporal error of the second motion with respect to the first motion changes, and a second parameter relating to a process in which the temporal error of the first motion with respect to the second motion changes. By means of the aspect described above, it is possible to generate a change parameter relating to the mutual relationship between the first motion and the second motion.

In a preferred example (third aspect) of the second aspect, the first parameter is a parameter of an autoregressive process that represents the process in which the temporal error of the second motion with respect to the first motion changes, and the second parameter is a parameter of an autoregressive process that represents the process in which the temporal error of the first motion with respect to the second motion changes. By means of the aspect described above, since the process in which the temporal error between the first motion and the second motion changes is approximated by means of the autoregressive process, it is possible to generate a change parameter expressing the process in which the error changes naturally.

According to a preferred example (fourth aspect) of any one of the first to the third aspects, the first motion is a performance of a first performance part from among a plurality of performance parts of a musical piece, the second motion is a performance of a second performance part, excluding the first performance part, from among the plurality of performance parts, and the temporal relationship between the first motion and the second motion is the temporal error between the performance time point of the first motion and the performance time point of the second motion. By means of the aspect described above, it is possible to generate a change parameter that appropriately represents the process in which the error in the performance time points between the first performance part and the second performance part of the musical piece changes.

In a preferred example (fifth aspect) of any one of the first to the fourth aspects, the trained model includes a first convolutional neural network for generating first feature data that represent features of the first time-series data, a second convolutional neural network, which has the same configuration as the first convolutional neural network, for generating second feature data that represent features of the second time-series data, and a fully connected layer that outputs the change parameter corresponding to the first feature data and the second feature data. By means of the aspect described above, first feature data and second feature data, which represent features that particularly contribute to the relationship between the contents of the first motion and the second motion and the process in which the temporal relationship between the two motions changes, are generated. Therefore, it is possible to generate an appropriate change parameter with respect to the first time-series data and the second time-series data.

In a preferred example (sixth aspect) of any one of the first to the fifth aspects, the information processing method further comprises controlling the actual performance of the second motion so as to be parallel to the actual performance of the first motion based on the change parameter.

A preferred aspect of this disclosure can also be realized by an information processing device that executes the information processing method of each aspect exemplified above or by a program that causes a computer to execute the information processing method of each aspect exemplified above.

What is claimed is:

1. An information processing method comprising:
generating a change parameter relating to a process in which a temporal relationship between a first motion and a second motion changes, by inputting, into a trained model, first time-series data that represent a content of the first motion, and second time-series data that represent a content of the second motion in parallel to the first motion.

2. The information processing method according to claim 1, wherein
the change parameter includes
a first parameter relating to a process in which a temporal error of the first motion with respect to the second motion changes, and
a second parameter relating to a process in which a temporal error of the second motion with respect to the first motion changes.

3. The information processing method according to claim 2, wherein
the first parameter is a parameter of an autoregressive process that represents the process in which the temporal error of the first motion with respect to the second motion changes, and
the second parameter is a parameter of an autoregressive process that represents the process in which the temporal error of the second motion with respect to the first motion changes.

4. The information processing method according to claim 1, wherein
the first motion is a performance of a first performance part from among a plurality of performance parts of a musical piece,
the second motion is a performance of a second performance part, excluding the first performance part, from among the plurality of performance parts, and
the temporal relationship between the first motion and the second motion is a temporal error between a performance time point of the first motion and a performance time point of the second motion.

5. The information processing method according to claim 1, wherein
the trained model includes
a first convolutional neural network that generates first feature data that represent a feature of the first time-series data,
a second convolutional neural network that has the same configuration as the first convolutional neural network and generates second feature data that represent a feature of the second time-series data, and
a fully connected layer that outputs the change parameter corresponding to the first feature data and the second feature data.

6. The information processing method according to claim 1, further comprising
controlling an actual performance of the second motion to be in parallel to an actual performance of the first motion based on the change parameter.

7. An information processing device comprising:
an electronic controller including at least one processor,
the electronic controller being configured to execute an estimation processing module that generates a change parameter relating to a process in which a temporal relationship between a first motion and a second motion changes, by inputting, into a trained model, first time-series data that represent a content of the first motion, and second time-series data that represent a content of the second motion in parallel to the first motion.

8. The information processing device according to claim 7, wherein
the change parameter includes
a first parameter relating to a process in which a temporal error of the first motion with respect to the second motion changes, and
a second parameter relating to a process in which a temporal error of the second motion with respect to the first motion changes.

9. The information processing device according to claim 8, wherein
the first parameter is a parameter of an autoregressive process that represents the process in which the temporal error of the first motion with respect to the second motion changes, and
the second parameter is a parameter of an autoregressive process that represents the process in which the temporal error of the second motion with respect to the first motion changes.

10. The information processing device according to claim 7, wherein
the first motion is a performance of a first performance part from among a plurality of performance parts of a musical piece,
the second motion is a performance of a second performance part, excluding the first performance part, from among the plurality of performance parts, and
the temporal relationship between the first motion and the second motion is a temporal error between a performance time point of the first motion and a performance time point of the second motion.

11. The information processing device according to claim 7, wherein
the trained model includes
a first convolutional neural network that generates first feature data that represent a feature of the first time-series data,
a second convolutional neural network that has the same configuration as the first convolutional neural network and generates second feature data that represent a feature of the second time-series data, and
a fully connected layer that outputs the change parameter corresponding to the first feature data and the second feature data.

12. The information processing device according to claim 7, wherein
the electronic controller is further configured to execute a performance control module that controls an actual performance of the second motion to be in parallel to an actual performance of the first motion based on the change parameter.

13. A non-transitory computer readable medium storing an information processing program that causes a computer to execute a processing, the processing comprising:
generating a change parameter relating to a process in which a temporal relationship between a first motion and a second motion changes, by inputting, into a trained model, first time-series data that represent a content of the first motion, and second time-series data that represent a content of the second motion in parallel to the first motion.

14. The non-transitory computer readable medium according to claim 13, wherein
the change parameter includes
a first parameter relating to a process in which a temporal error of the first motion with respect to the second motion changes, and
a second parameter relating to a process in which a temporal error of the second motion with respect to the first motion changes.

15. The non-transitory computer readable medium according to claim 14, wherein
the first parameter is a parameter of an autoregressive process that represents the process in which the temporal error of the first motion with respect to the second motion changes, and
the second parameter is a parameter of an autoregressive process that represents the process in which the temporal error of the second motion with respect to the first motion changes.

16. The non-transitory computer readable medium according to claim 13, wherein
the first motion is a performance of a first performance part from among a plurality of performance parts of a musical piece,
the second motion is a performance of a second performance part, excluding the first performance part, from among the plurality of performance parts, and
the temporal relationship between the first motion and the second motion is a temporal error between a performance time point of the first motion and a performance time point of the second motion.

17. The non-transitory computer readable medium according to claim 13, wherein
the trained model includes
a first convolutional neural network that generates first feature data that represent a feature of the first time-series data,
a second convolutional neural network that has the same configuration as the first convolutional neural network and generates second feature data that represent a feature of the second time-series data, and
a fully connected layer that outputs the change parameter corresponding to the first feature data and the second feature data.

18. The non-transitory computer readable medium according to claim 13, wherein
the processing further comprises controlling an actual performance of the second motion to be in parallel to an actual performance of the first motion based on the change parameter.

\* \* \* \* \*